(12) United States Patent
Yu

(10) Patent No.: US 10,153,659 B2
(45) Date of Patent: Dec. 11, 2018

(54) UNINTERRUPTIBLE POWER CONTROL METHOD AND ELECTRONIC DEVICE WITH UNINTERRUPTIBLE POWER SUPPLY BASED ON DETECTED MOTION OF THE ELECTRONIC DEVICE

(71) Applicant: GETAC TECHNOLOGY CORPORATION, Hsinchu County (TW)

(72) Inventor: Wen-Huan Yu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 128 days.

(21) Appl. No.: 15/231,697

(22) Filed: Aug. 8, 2016

(65) Prior Publication Data
US 2018/0041069 A1    Feb. 8, 2018

(51) Int. Cl.
*H02J 9/06* (2006.01)
*G01P 15/00* (2006.01)
*H04M 1/02* (2006.01)
*G06F 1/30* (2006.01)

(52) U.S. Cl.
CPC .............. *H02J 9/061* (2013.01); *G01P 15/00* (2013.01); *G06F 1/30* (2013.01); *H04M 1/0202* (2013.01)

(58) Field of Classification Search
None
See application file for complete search history.

(56) References Cited

U.S. PATENT DOCUMENTS

| | | | | |
|---|---|---|---|---|
| 5,859,481 A * | 1/1999 | Banyas | ........... | H02J 7/0024 307/130 |
| 6,605,923 B1 * | 8/2003 | Kellogg | ........... | H02J 7/0013 320/110 |
| 7,509,151 B1 * | 3/2009 | Edwards | ........... | H04M 1/0262 455/575.1 |
| 9,967,377 B1 * | 5/2018 | Romain | ........... | H04M 1/0262 |
| 2005/0162132 A1 * | 7/2005 | Nagasawa | ........... | H02J 9/061 320/128 |
| 2006/0236761 A1 * | 10/2006 | Inoue | ........... | G01P 3/22 73/510 |
| 2008/0218366 A1 * | 9/2008 | Chen | ........... | G01P 15/00 340/669 |
| 2008/0253015 A1 * | 10/2008 | Harrington | ........... | G11B 19/042 360/75 |
| 2010/0124896 A1 * | 5/2010 | Kumar | ........... | H04B 1/1607 455/404.1 |

(Continued)

FOREIGN PATENT DOCUMENTS

| CN | 204242371 U | 4/2015 |
|---|---|---|
| EP | 1715349 A2 | 10/2006 |

(Continued)

*Primary Examiner* — Rexford Barnie
*Assistant Examiner* — David Shiao

(57) ABSTRACT

An uninterruptible power control method includes the steps of: reading a detection result from a motion sensor of an electronic device, determining whether the detection result meets a movement condition, and turning on a power supply path of a sub-battery module of the electronic device when the detection result meets the movement condition. The electronic device is powered by a primary battery module in normal state, and the sub-battery module is built in the electronic device.

19 Claims, 3 Drawing Sheets

(56) References Cited

U.S. PATENT DOCUMENTS

2011/0109170 A1* 5/2011 Chen .................... G11B 19/043
307/121
2016/0218555 A1* 7/2016 Slaby ........................ H02J 9/06

FOREIGN PATENT DOCUMENTS

| TW | M418840 U | 12/2011 |
| TW | M500052 U | 5/2015 |
| TW | M522458 U | 5/2016 |

* cited by examiner

UNINTERRUPTIBLE POWER CONTROL METHOD AND ELECTRONIC DEVICE WITH UNINTERRUPTIBLE POWER SUPPLY BASED ON DETECTED MOTION OF THE ELECTRONIC DEVICE

BACKGROUND OF THE INVENTION

Field of the Invention

The present invention relates to power control technology and, more particularly, to an uninterruptible power control method and an electronic device with uninterruptible power supply.

Description of the Prior Art

Due to technological advancement and development, electronic devices are increasingly common and designed to exhibit features, such as lightweight, compact, and portable, so that electronic device users are no longer confined to a fixed place in order to use electronic devices.

However, the portability of portable electronic devices leads to an outcome, that is, a great increase in the chance that they will fall. If a replaceable battery of a portable electronic device in normal use (i.e., in a normal state) accidentally escapes therefrom (for example, when the portable electronic device falls to the ground hard enough to cast the replaceable battery out of the portable electronic device) the portable electronic device will shut down instantly for loss of power supply. The unexpected shutdown of the portable electronic device ends up with a loss of unsaved data or temporarily saved data which is otherwise held in the portable electronic device. As a result, the portable electronic device malfunctions and thus brings inconvenience to the user.

SUMMARY OF THE INVENTION

In an embodiment, an uninterruptible power control method comprises the steps of: reading a detection result from a motion sensor of an electronic device; determining whether the detection result meets a motion condition; and turning on a power supply path of a secondary battery module of the electronic device when the detection result meets the motion condition, wherein a primary battery module supplies power to the electronic device in a normal state, and the secondary battery module is built in the electronic device.

In an embodiment, an electronic device with uninterruptible power supply comprises a power input end, a secondary battery module, a switch module, a motion sensor, and a control unit. The electronic device in a normal state is powered by a primary battery module through the power input end. The switch module is coupled to between the power input end and the secondary battery module. The motion sensor senses the motion of the electronic device and yields a detection result accordingly. The control unit determines whether the detection result meets a motion condition. After determining that the detection result meets the motion condition, the control unit generates a start signal to turn on the switch module, thereby turning on a power supply path of the secondary battery module.

In conclusion, according to embodiments of the present invention, an uninterruptible power control method and an electronic device with uninterruptible power supply are characterized in that: upon determination that a detection result from a motion sensor of an electronic device meets a motion condition, a power supply path of a secondary battery module is turned on; hence, even if the electronic device in an unsafe state (for example, falling or being thrown) fails to receive power supplied by a primary battery module, the electronic device will receive power through a power supply circuit of the secondary battery module so that the electronic device will keep functioning and thus avoid suffering a loss of data and getting damaged.

The fine features and advantages of the present invention are illustrated with embodiments and described hereunder to enable persons skilled in the art to understand the technical solution of the present invention and implement it accordingly. Furthermore, persons skilled in the art can easily understand the objectives and advantages of the present invention by making reference to the specification, claims and drawings of the present invention.

DETAILED DESCRIPTION OF THE EMBODIMENTS

Figure 1:
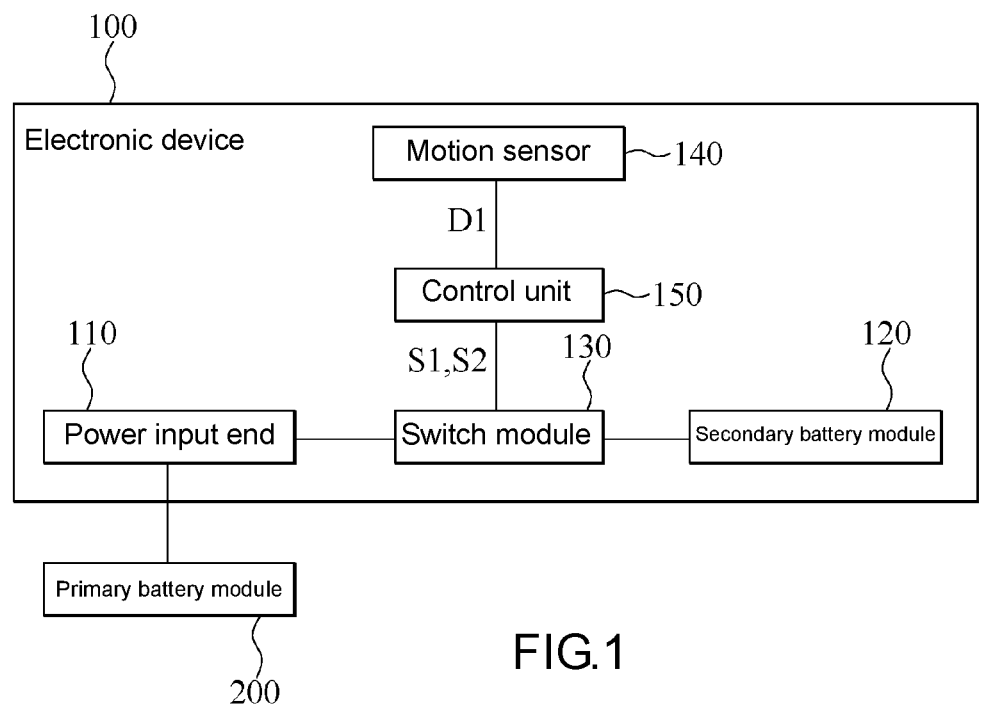
FIG. 1 is a block diagram of an electronic device with uninterruptible power supply according to an embodiment of the present invention.

FIG. 1 is a block diagram of an electronic device with uninterruptible power supply according to an embodiment of the present invention. Referring to FIG. 1, an electronic device 100 with uninterruptible power supply comprises a power input end 110, a secondary battery module 120, a switch module 130, a motion sensor 140, and a control unit 150. The control unit 150 is coupled to the switch module 130 and the motion sensor 140. The switch module 130 is coupled to between the secondary battery module 120 and the power input end 110.

In some embodiments, the electronic device 100 is a portable electronic device, such as a notebook computer, a tablet, or a mobile phone, but the present invention is not limited thereto.

The power input end 110 receives a power for maintaining the operation of the electronic device 100. In general, the electronic device 100 in normal use (a normal state) is powered by a primary battery module 200 to maintain its operation. Given the contact between the power input end 110 and its power supply electrode (not shown), the primary battery module 200 has its stored power supplied, through the power input end 110, to the electronic device 100 to maintain the operation of the electronic device 100. To this end, the electronic device 100 has a battery holding portion (not shown), and the primary battery module 200 is separably coupled to the battery holding portion (not shown) of the electronic device 100 to allow a user to change the primary battery module 200 easily.

In some embodiments, the primary battery module 200 is a lithium battery or a rechargeable lithium-ion battery, but the present invention is not limited thereto.

The secondary battery module 120 stores backup power. The secondary battery module 120 is electrically connected to the power input end 110 through the switch module 130 when the switch module 130 is turned on; hence, when the primary battery module 200 fails to power the electronic device 100, the secondary battery module 120 supplies power to the electronic device 100 through the power input end 110, so as to maintain the operation of the electronic device 100. The path which extends from the secondary battery module 120 to the power input end 110 through the switch module 130 is the power supply path of the secondary battery module 120. The power supply path of the secondary battery module 120 is built by turning on the switch module 130 and severed by disconnecting the switch module 130. Therefore, after the power supply path of the secondary battery module 120 has been built, the secondary battery module 120 begins supplying stored power to the electronic device 100. After the power supply path of the secondary battery module 120 has been severed, the secondary battery module 120 stops supplying stored power to the electronic device 100. The secondary battery module 120 is a stand-alone battery and is built in the electronic device 100, for example, mounted on a circuit board disposed in the electronic device 100.

In general, to prevent the electronic device 100 from being overweight, the secondary battery module 120 built in the electronic device 100 must not be bulky. Hence, the secondary battery module 120 has a lower capacitance than the primary battery module 200. In some embodiments, the secondary battery module 120 is a mercury battery or capacitance module, but the present invention is not limited thereto.

The motion sensor 140 senses the motion of the electronic device 100 and yields detection result D1 accordingly. In some embodiments, the motion sensor 140 is a G-sensor, a gyroscope, or a combination thereof, whereas detection result D1 is gravity information, posture information, or a combination thereof, of the electronic device 100. The gravity information includes gravitational acceleration (i.e., G), motion velocity, and displacement of the electronic device 100, whereas the posture information includes azimuth angle and/or angular velocity of the electronic device 100, but the present invention is not limited thereto.

The control unit 150 reads detection result D1 yielded by the motion sensor 140, compares detection result D1 with a predetermined motion condition, and determines whether detection result D1 meets the motion condition. In some embodiments, the motion condition is that detection result D1 is larger than a corresponding threshold (for example, G is larger than 0.2, and/or angular velocity about any one of X-axis, Y-axis, and Z-axis is larger than 5° per second) or that detection result D1 falls outside a corresponding range, but the present invention is not limited thereto, as the motion condition can be predetermined by the user as needed.

If the control unit 150 determines that detection result D1 meets the motion condition (for example, detection result D1 is larger than a corresponding threshold) the control unit 150 will determine that the electronic device 100 is in an unsafe state for the time being, for example, undergoing a speedy, vigorous motion, such as falling or being thrown, and the control unit 150 will generate start signal S1 to turn on the switch module 130, thereby turning on the power supply path of the secondary battery module 120. Hence, even if the primary battery module 200 escapes from the battery holding portion as the electronic device 100 is in an unsafe state (for example, falling or being thrown), the electronic device 100 will be powered by the secondary battery module 120 and keep functioning without shutting down instantly. Conversely, when the control unit 150 determines that detection result D1 does not meet the motion condition, it means that the control unit 150 determines that the electronic device 100 is in a safe state for the time being, and thus the control unit 150 does not generate start signal S1.

The motion sensor 140 senses the electronic device 100 at an interval of one second, and yields detection result D1 accordingly at the end of each instance of sensing. Therefore, the control unit 150 determines, one by one, whether detection results D1 yielded by the motion sensor 140 meet the motion condition. When the control unit 150 generates start signal S1 to turn on the switch module 130 and then determines that the next detection result D1 yielded by the motion sensor 140 does not meet the motion condition, it means that the control unit 150 determines that the electronic device 100 has transited from an unsafe state to a safe state; hence, at this point, the control unit 150 generates shutdown signal S2 to disconnect the switch module 130 and thus sever the power supply path which extends from the secondary battery module 120 to the power input end 110.

In an embodiment, as soon as the control unit 150 determines that the motion condition is not met, the control unit 150 generates shutdown signal S2 to disconnect the switch module 130 and thus sever the power supply path of the secondary battery module 120. In another embodiment, the control unit 150 generates, when a predetermined time period (such as 30 seconds or one minute) has elapsed after determining that the motion condition is not met, shutdown signal S2 to disconnect the switch module 130 and thus sever the power supply path of the secondary battery module 120 such that, if the primary battery module 200 escapes from the electronic device 100 and the user mounts the primary battery module 200 in the battery holding portion of the electronic device 100 within the predetermined time period, the electronic device 100 will not shut down instantly.

In some embodiments, the control unit 150 is an embedded controller (EC), a system-on-a-chip (SoC), a central processing unit (CPU), or a microcontroller (MCU), but the present invention is not limited thereto.

Figure 2:
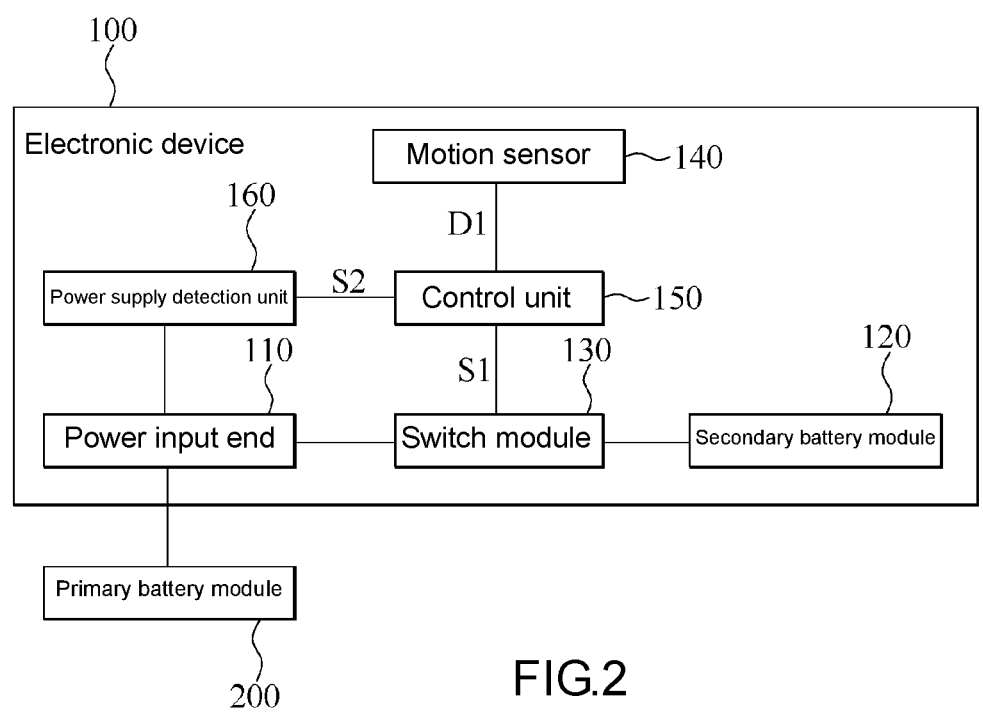
FIG. 2 is a block diagram of the electronic device with uninterruptible power supply according to another embodiment of the present invention.

FIG. 2 is a block diagram of the electronic device with uninterruptible power supply according to another embodiment of the present invention. Referring to FIG. 2, the electronic device 100 with uninterruptible power supply further comprises a power supply detection unit 160, whereas the power supply detection unit 160 is coupled to the power input end 110 and the control unit 150.

The power supply detection unit 160 detects whether the power input end 110 receives power supplied by the primary battery module 200 and generates, upon detection that the power input end 110 receives power supplied by the primary battery module 200, shutdown signal S2 to disconnect the switch module 130 and thus sever the power supply path of the secondary battery module 120. Conversely, if the power supply detection unit 160 does not detect that the power input end 110 receives power supplied by the primary battery module 200, the power supply detection unit 160 will not generate shutdown signal S2.

In an embodiment, when a predetermined time period (such as 30 seconds or one minute) has elapsed after the power supply detection unit 160 detects that the power input end 110 receives power supplied by the primary battery module 200, the power supply detection unit 160 generates shutdown signal S2 to disconnect the switch module 130 and thus sever the power supply path of the secondary battery module 120. Hence, if the electronic device 100 meets a motion condition but the primary battery module 200 has not yet escaped from the electronic device 100 (for example, in the situation where the electronic device 100 is falling but has not yet hit the ground) the power supply path of the secondary battery module 120 will not be severed, and thus the electronic device 100 will not shut down instantly as soon as the primary battery module 200 escapes from the electronic device 100 (for example, in a collision). Therefore, the electronic device 100 will not shut down instantly, provided that the primary battery module 200 of the electronic device 100 continues to supply power after the predetermined time period has elapsed (for example, in the situation where during the predetermined time period the electronic device 100 leaves the unsafe state and the escaped primary battery module 200 is returned to the electronic device 100, or in the situation where during the predetermined time period the electronic device 100 leaves the unsafe state but the battery module 200 does not escape.)

In an embodiment, after generating shutdown signal S2, the power supply detection unit 160 sends shutdown signal S2 to the control unit 150 such that the control unit 150 disconnects the switch module 130 according to shutdown signal S2. Therefore, at this point, the control over the switch module 130 is mainly carried out by the control unit 150, whereas shutdown signal S2 generated from the power supply detection unit 160 triggers the control unit 150 to exercise control over the switch module 130. However, the present invention is not limited thereto.

In another embodiment, shutdown signal S2 generated from the power supply detection unit 160 is directly sent to the switch module 130 to sever the power supply path which extends from the secondary battery module 120 to the power input end 110. Therefore, at this point, the control over the switch module 130 is jointly managed by the control unit 150 and the power supply detection unit 160, whereas the switch module 130 operates according to the received start signal S1 and shutdown signal S2.

In some embodiments, it is only when the control unit 150 generates start signal S1 to turn on the switch module 130 that the power supply detection module 160 begins to perform detection, but the present invention is not limited thereto. In another embodiments, the power supply detection module 160 will not begin to perform detection unless and until the control unit 150 determines that the electronic device 100 meets a motion condition according to a detection result D1 and then the control unit 150 determines that the electronic device 100 does not meet the motion condition according to another detection result D1.

Figure 3:
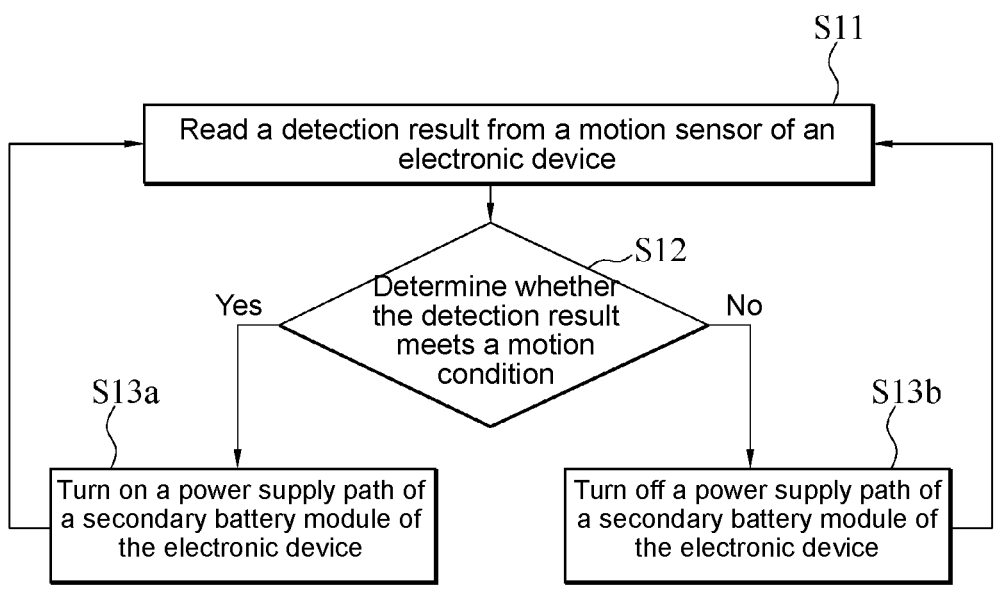
FIG. 3 is a flowchart of an uninterruptible power control method according to an embodiment of the present invention.

FIG. 3 is a flowchart of an uninterruptible power control method according to an embodiment of the present invention. Referring to FIG. 1 and FIG. 3, in an embodiment, the control unit 150 reads detection result D1 from the motion sensor 140 of the electronic device 100 (step S11). Then, the control unit 150 determines whether detection result D1 meets a motion condition (step S12). If the control unit 150 determines that detection result D1 meets the motion condition, the control unit 150 will turn on a power supply path of the secondary battery module 120 of the electronic device 100 (step S13a). Conversely, if the control unit 150 determines that detection result D1 does not meet the motion condition, the control unit 150 will turn off a power supply path of the secondary battery module 120 of the electronic device 100 (step S13b).

The electronic device 100 in normal use (a normal state) is powered by the primary battery module 200 mounted in its battery holding portion. The secondary battery module 120 is built in the electronic device 100 and parallel-connected to the primary battery module 200 through the switch module 130. The path which extends from the secondary battery module 120 to the power input end 110 through the switch module 130 is the power supply path of the secondary battery module 120.

In an embodiment of step S11, the motion sensor 140 senses the electronic device 100 continuously or at an interval of a predetermined time period and yields detection results D1 accordingly. The control unit 150 reads continuously and consecutively all detection results D1 yielded by the motion sensor 140; alternatively, the control unit 150 reads at an interval of a processing time period detection results D1 yielded by the motion sensor 140.

In an embodiment of step S12, the control unit 150 compares the read detection results D1 with a predetermined motion condition sequentially and determines whether the detection results D1 meet the motion condition. In some embodiments, the motion condition is that detection result D1 is larger than a corresponding threshold, for example, G is larger than 0.2, and/or angular velocity about any one of X-axis, Y-axis, and Z-axis is larger than 5° per second. The control unit 150 determines, according to the result of the comparison between detection result D1 and the motion condition, whether the electronic device 100 is in an unsafe state for the time being, for example, whether the electronic device 100 is undergoing a speedy, vigorous motion, such as falling or being thrown.

When the control unit 150 determines that detection result D1 meets the motion condition, it means that the control unit 150 determines that the electronic device 100 is in an unsafe state for the time being. To prevent the electronic device 200 from shutting down instantly as soon as the primary battery module 200 escapes from the electronic device 100, the process flow of the method of the present invention goes to step S13a for turning on the power supply path of the secondary battery module 120 to keep the electronic device 100 operating. At this point, the control unit 150 generates start signal S1 to turn on the switch module 130, thereby turning on the power supply path of the secondary battery module 120.

Conversely, when the control unit 150 determines that detection result D1 does not meet a motion condition, it means that, at this point, the control unit 150 determines that the electronic device 100 is in a safe state, and therefore that it is not necessary to turn on the power supply path of the secondary battery module 120, thereby allowing the process flow of the method of the present invention to go to step S13b. At this point, the control unit 150 generates shutdown signal S2 to disconnect the switch module 130 and thus sever the power supply path which extends from the secondary battery module 120 to the power input end 110. Therefore, if the control unit 150 determines that detection result D1 does not meet a motion condition, the secondary battery module 120 will not supply power.

In an embodiment of step S13b, if the switch module 130 is initially disconnected, the control unit 150 will not need to generate and send shutdown signal S2 to the switch module 130. Conversely, if the switch module 130 is initially turned on (that is, step S13a is executed during a preceding round of a power control process, thereby turning on the power supply path of the secondary battery module 120) the control unit 150 will need to generate and send shutdown signal S2 in order to disconnect the switch module 130 and thus sever the power supply path of the secondary battery module 120.

In an embodiment, the control unit 150 generates shutdown signal S2 only after a predetermined time period has elapsed. In another embodiment, the control unit 150 generates shutdown signal S2 upon determination that detection result D1 does not meet a motion condition. Both step S13a and step S13b are followed by step S11 to perform another round of the power control process.

Figure 4:
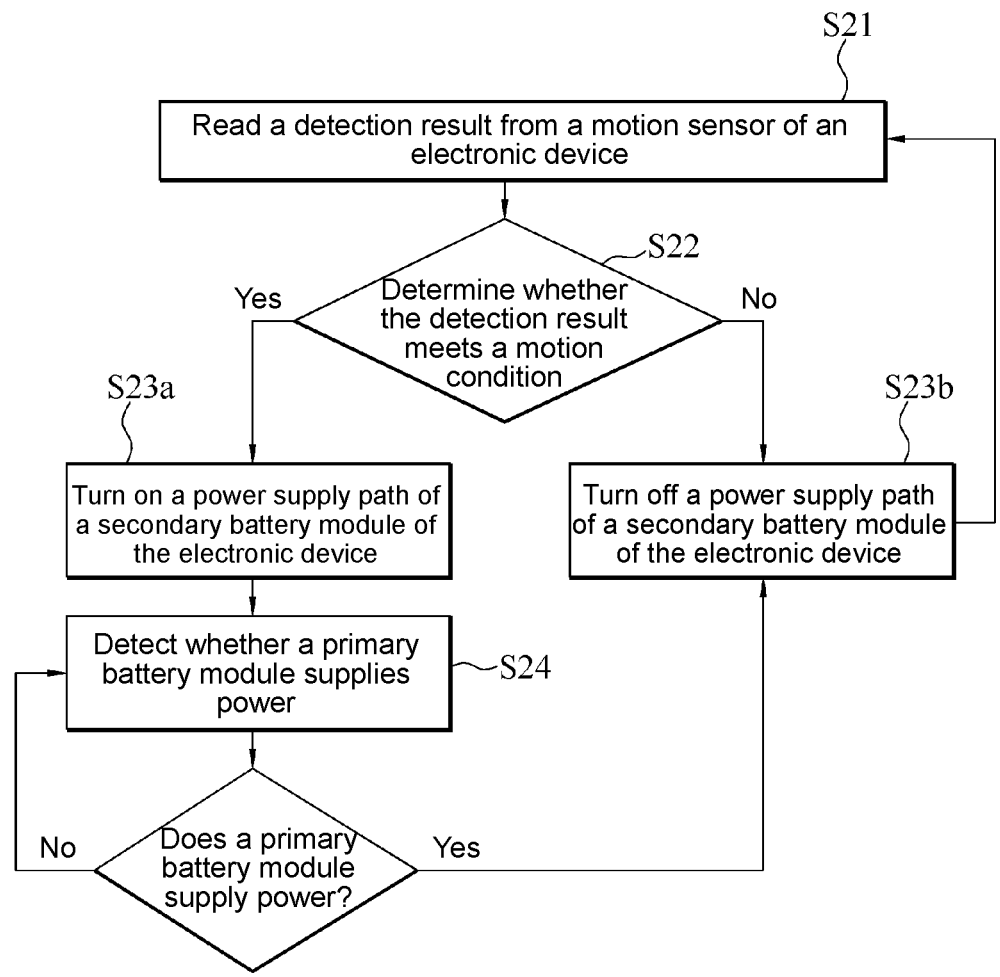
FIG. 4 is a flowchart of the uninterruptible power control method according to another embodiment of the present invention.

FIG. 4 is a flowchart of the uninterruptible power control method according to another embodiment of the present invention. Referring to FIG. 2 and FIG. 4, in an embodiment, the control unit 150 reads detection result D1 from the motion sensor 140 of the electronic device 100 (step S21). Then, the control unit 150 determines whether detection result D1 meets a motion condition (step S22). If the control unit 150 determines that detection result D1 does not meet the motion condition, the control unit 150 will turn off a power supply path of the secondary battery module 120 of the electronic device 100 (step S23b). Conversely, if the control unit 150 determines that detection result D1 meets the motion condition, the control unit 150 will turn on a power supply path of the secondary battery module 120 of the electronic device 100 (step S23a), and then the power supply detection unit 160 will begin to detect whether the primary battery module 200 supplies power (step S24). When the power supply detection unit 160 detects that the primary battery module 200 supplies power, not only does the power supply detection unit 160 generate shutdown signal S2, but step S23b also resumes, so as to turn off the power supply path of the secondary battery module 120. Conversely, if the power supply detection unit 160 detects that the primary battery module 200 does not supply power, step S24 will repeat until the power supply detection unit 160 detects that the primary battery module 200 supplies power and generates shutdown signal S2, and then the power supply detection unit 160 stops detecting.

Step S21, step S22, step S23a and step S23b are substantially identical to step S11, step S12, step S13a and step S13b, respectively, and thus are not described again for the sake of brevity.

In conclusion, according to embodiments of the present invention, an uninterruptible power control method and an electronic device with uninterruptible power supply are characterized in that: upon determination that a detection result from a motion sensor of an electronic device meets a motion condition, a power supply path of a secondary battery module is turned on; hence, even if the electronic device in an unsafe state (for example, falling or being thrown) fails to receive power supplied by a primary battery module, the electronic device will receive power through a power supply circuit of the secondary battery module so that the electronic device will keep functioning and thus avoid suffering a loss of data and getting damaged.

Although the present invention is disclosed above by preferred embodiments, the preferred embodiments are not restrictive of the present invention. Slight changes and modifications made to the preferred embodiments without departing from the spirit of the present invention by persons skilled in the art should be covered by the present invention. Accordingly, the legal protection for the present invention should be defined by the appended claims.

What is claimed is:

1. An uninterruptible power control method, comprising the steps of:
supplying power to a power input end of an electronic device in a normal state by a primary battery module via a first power supply path;
reading a detection result from a motion sensor of the electronic device, wherein the motion sensor senses motion of the electronic device;
determining whether the detection result meets a motion condition;
turning on a second power supply path of a secondary battery module to the power input end of the electronic device when the detection result meets the motion condition, wherein the secondary battery module is built in the electronic device, and wherein the primary battery module and the secondary battery module are electrically connected to the power input end in parallel when the second power supply path is turned on.

2. The uninterruptible power control method of claim 1, further comprising the step of supplying no power from the secondary battery module when the detection result does not meet the motion condition.

3. The uninterruptible power control method of claim 1, further comprising, after the step of turning on the second power supply path of the secondary battery module of the electronic device, the steps of:
reading at least one other detection result after the detection result;
determining whether the at least one other detection result meets the motion condition; and
turning off the second power supply path of the secondary battery module upon determination that the at least one other detection result does not meet the motion condition.

4. The uninterruptible power control method of claim 1, further comprising, after the step of turning on the second power supply path of the secondary battery module of the electronic device, the steps of:
detecting whether the primary battery module supplies power; and
turning off the second power supply path of the secondary battery module upon detection that the primary battery module supplies power.

5. The uninterruptible power control method of claim 4, wherein the step of detecting whether the primary battery module supplies power to the power input end begins when the detection result meets the motion condition.

6. The uninterruptible power control method of claim 5, wherein, upon detecting that the primary battery module supplies power to the power input end, a predetermined time period is allowed to elapse before turning off the second power supply path of the secondary battery module.

7. The uninterruptible power control method of claim 1, wherein the secondary battery module is connected to the power input end through a switch module, and the turning-on step builds the second power supply path of the secondary battery module by turning on the switch module.

8. The uninterruptible power control method of claim 1, wherein the motion sensor comprises one of a G-sensor, a gyroscope sensing unit, and a combination thereof, and the detection result comprises one of a gravity information, a posture information, and a combination thereof, of the electronic device.

9. The uninterruptible power control method of claim 1, wherein the primary battery module has a larger capacitance than the secondary battery module.

10. The uninterruptible power control method of claim 1, wherein the motion condition is that acceleration is larger than 0.2G, or that angular velocity about any one of X-axis, Y-axis, and Z-axis is larger than 5° per second.

11. An electronic device with uninterruptible power supply, comprising:

a power input end, wherein the electronic device in a normal state is powered by a primary battery module through the power input end;

a secondary battery module;

a switch module coupled between the power input end and the secondary battery module;

a motion sensor for sensing motion of the electronic device and yielding a detection result; and a control unit for determining whether the detection result meets a motion condition and, upon determination that the detection result meets the motion condition, generating a start signal to turn on the switch module, thereby turning on a power supply path of the secondary battery module to the power input end, wherein the primary battery module and the secondary battery module are electrically connected to the power input end In parallel when the switch module is turned on.

12. The electronic device with uninterruptible power supply according to claim 11, wherein the control unit does not generate the start signal upon determination that the detection result does not meet the motion condition.

13. The electronic device with uninterruptible power supply according to claim 11, wherein, after generating the start signal, the control unit determines whether at least one other detection result yielded by the motion sensor meets the motion condition and then, upon determination that the at least one other detection result does not meet the motion condition, generates a shutdown signal to disconnect the switch module.

14. The electronic device with uninterruptible power supply according to claim 11, further comprising a power supply detection unit for detecting whether the power input end receives power supply from the primary battery module and, upon detection that the power input end receives power supply from the primary battery module, generating a shutdown signal to disconnect the switch module.

15. The electronic device with uninterruptible power supply according to claim 14, wherein the power supply detection unit begins detecting whether the primary battery module supplies power to the power input end when the detection result meets the motion condition.

16. The electronic device with uninterruptible power supply according to claim 15, wherein, upon detecting that the primary battery module supplies power to the power input end, the power supply detection unit allows a predetermined time period to elapse before generating the shutdown signal.

17. The electronic device with uninterruptible power supply according to claim 11, wherein the motion sensor comprises one of a G-sensor, a gyroscope sensing unit, and a combination thereof, and the detection result comprises one of a gravity information, a posture information, and a combination thereof, of the electronic device.

18. The electronic device with uninterruptible power supply according to claim 11, wherein the primary battery module has larger capacitance than the secondary battery module.

19. The electronic device with uninterruptible power supply according to claim 11, wherein the motion condition is that acceleration is larger than 0.2G, or that angular velocity about any one of X-axis, Y-axis, and Z-axis is larger than 5° per second.

* * * * *